(12) United States Patent
Lee et al.

(10) Patent No.: US 8,510,951 B2
(45) Date of Patent: Aug. 20, 2013

(54) METHOD FOR PRODUCING A LENS PATTERN ON ROLL

(75) Inventors: Hee-Cheong Lee, Yongin-si (KR);
Sang-Hoon Lee, Gumi-si (KR);
Jun-Sang Park, Gumi-si (KR);
Tae-Yong Ryu, Seoul (KR)

(73) Assignee: Toray Advanced Materials Korea Inc., Gyeongsanbuk-do (KR)

( * ) Notice: Subject to any disclaimer, the term of this patent is extended or adjusted under 35 U.S.C. 154(b) by 830 days.

(21) Appl. No.: 12/549,638

(22) Filed: Aug. 28, 2009

(65) Prior Publication Data

US 2011/0008595 A1    Jan. 13, 2011

(30) Foreign Application Priority Data

Jul. 7, 2009    (KR) .................. 10-2009-0061703

(51) Int. Cl.
    *B29C 59/04*    (2006.01)
(52) U.S. Cl.
    USPC ........... 29/895.32; 29/895.3; 492/31; 349/95; 216/106
(58) Field of Classification Search
    USPC ................... 29/895, 895.3, 895.32; 492/37, 492/31; 349/95, 187; 216/102, 103, 104, 216/106; 101/170
    See application file for complete search history.

(56) References Cited

U.S. PATENT DOCUMENTS

| | | | | |
|---|---|---|---|---|
| 2,332,003 A * | 10/1943 | New | ............... | 216/53 |
| 3,214,309 A * | 10/1965 | Di Leo et al. | ............... | 216/9 |
| 4,879,791 A * | 11/1989 | Herb | ............... | 29/895.32 |
| 6,491,481 B1 * | 12/2002 | Border et al. | ............... | 409/131 |
| 6,787,072 B2 * | 9/2004 | Border et al. | ............... | 264/2.5 |
| 7,125,505 B1 * | 10/2006 | Dona et al. | ............... | 264/2.5 |
| 7,837,461 B2 * | 11/2010 | Amano et al. | ............... | 425/471 |
| 7,925,192 B2 * | 4/2011 | Kojima et al. | ............... | 399/276 |
| 7,988,444 B2 * | 8/2011 | Amano et al. | ............... | 425/471 |
| 2003/0045412 A1 * | 3/2003 | Schulz et al. | ............... | 492/30 |
| 2009/0185838 A1 * | 7/2009 | Aruga et al. | ............... | 399/286 |

FOREIGN PATENT DOCUMENTS

| | | |
|---|---|---|
| JP | 11-216761 | 8/1999 |
| JP | 2001-188110 | 7/2001 |
| JP | 2003-011131 | 1/2003 |
| JP | 2004-306554 | 11/2004 |
| JP | 2005-134706 | 5/2005 |

(Continued)

OTHER PUBLICATIONS

Translation of JP 2005-134706 A aquired from the JPO website on Jul. 19, 2012.*

Langworthy, Chemical Milling—vol. 16 ASM Handbook: Machining, ASM International retrieved from www.knovel.com Jul. 19, 2012, pp. 579-586.*

(Continued)

*Primary Examiner* — David Bryant
*Assistant Examiner* — Jason L Vauhgan
(74) *Attorney, Agent, or Firm* — Harness, Dickey & Pierce, P.L.C.; Anthony G. Fussner; Kisuk Lee

(57) ABSTRACT

The present disclosure generally relates to a method for producing lens patterns on a roll which is used to produce optical films wherein the method comprises forming a resin film on a roll comprising a plated layer which has been surface-plated with copper (Cu) or nickel (Ni); producing a preliminary lens pattern by striking the surface of the resin film on the roll with a chisel; etching with an etching solution the roll having the preliminary lens pattern formed thereon; and removing the resin film, and a roll for producing optical films comprising lens patterns formed thereon by the same method.

10 Claims, 9 Drawing Sheets

(56) References Cited

FOREIGN PATENT DOCUMENTS

| | | |
|---|---|---|
| JP | 2005-178052 | 7/2005 |
| JP | 2005-335167 | 12/2005 |
| JP | 2007-229996 | 9/2007 |
| TW | 200831295 | 8/2008 |
| WO | WO 2011/004922 | 1/2011 |

OTHER PUBLICATIONS

Written Opinion and International Search Report in PCT/KR2009/003730 dated Jul. 27, 2010.
Office Action issued in TW Patent Application No. 098128671, dated Mar. 14, 2012, with English Translation of Search Report, dated Mar. 8, 2012.

* cited by examiner

METHOD FOR PRODUCING A LENS PATTERN ON ROLL

CROSS-REFERENCE TO RELATED APPLICATION

This application claims the benefit and priority to Korean Patent Application No. 10-2009-0061703, filed Jul. 7, 2009. The entire disclosure of the application identified in this paragraph is incorporated herein by reference.

FIELD

The present disclosure generally relates to a method of producing a lens pattern on a roll, wherein the roll is used to produce optical films, and a roll for producing optical films comprising a lens pattern formed thereon by the same method. Specifically, the present disclosure relates to a method for producing a lens pattern on a roll, wherein the roll is used to produce optical films, by which a linear or non-linear lens pattern can be formed directly on the roll, the shapes of lens patterns can be diversified, the curvature of lens patterns can be adjusted as desired, and the curvature can be formed deeper than the hemisphere of the lens pattern, and a roll for producing optical films comprising a lens pattern formed thereon by the same method.

BACKGROUND

In general, a variety of optical films, such as a light diffusion plate, a light diffusion film, and a prism film, are used in flat-panel display devices, such as liquid crystal displays (LCDs). Recently, there is a need to improve the optical efficiency of combined optical films while providing various functions of optical films. Especially, there is a need to adjust lens patterns on the surface of optical films and in width-to-depth ratio (hereinafter "curvature") of the lens patterns.

In order to produce a linear lens pattern, e.g., a lens pattern on a conventional prism film, a direct carving method has been described as follows: first, nickel or copper is plated onto a surface of an iron roll, and a linear prism lens pattern is formed through Bite processing, as shown in FIG. 1. However, it is difficult to produce a zero defect roll and only a linear lens pattern can be formed by the Bite processing. In addition, when two-axis processing is performed to make an angle of 90° using a multi-axis processor, a pyramid lens pattern can be produced; however, the processing time is very long (usually 15 to 30 days), thereby drastically increasing manufacturing cost.

Furthermore, as a method for producing a non-linear lens pattern, the micro lens film (MLF) manufacturing method has been described as follows: as shown in FIG. 2, spherical beads are applied on a polyethylene terephthalate (PET) film having ultraviolet- or heat-curable adhesive coated thereon, and then the adhesive is cured. Next, either nickel (Ni) is subjected to electroless plating on the film, or the PET film having the ultraviolet- or heat-curable adhesive coated thereon is laminated and cured, and the PET film is exfoliated to manufacture products with a mold, such as a belt-type mold. However, productivity is low because a seam inevitably forms when a belt-type mold is used in manufacture. Direct carving on a cylindrical roll is not possible. Product quality can be greatly affected by the shape and degree of dispersion of beads. Adjustments to the number density and shape of lenses by the application of beads and to the formation of various lens patterns and curvature thereof are limited.

Another manufacturing method has been described as follows: as shown in FIG. 3, a photomask having a lens pattern of an appropriate size is used to expose light on a PET film that has photoresist coated thereon. Next an exposed area or an un-exposed area of the photoresist is developed, and a raised lens pattern is formed through heat treatment. Either nickel (Ni) is subjected to electroless plating thereon, or the PET film having an ultraviolet- or heat-curable resin coated thereon is laminated and then cured, as in the method of bead application; and the PET film is exfoliated to manufacture products with a mold, such as a belt-type mold. However, this method also has the same disadvantages as the MLF manufacturing method in that various lens patterns and curvatures cannot be implemented because a seam inevitably forms when a belt-type mold is used. Direct carving on a cylindrical roll is not possible; the number density of the lens is too high, cost for making the mold is too high, and there is a limitation in forming lens.

Yet another manufacturing method has been described as follows: as shown in FIG. 4a, a photoresist layer is deposited onto a cylindrical roll having copper (Cu) plated thereon. The planar shape of a desired lens pattern is etched by laser processing: the area exposed to laser is developed in the case of a negative photoresist; and in the case of a positive photoresist, the area exposed to the laser decomposes. Then etching solution is applied. But, the cross-section of the resulting lens pattern is formed only in a shape such that the depth (P) of the lens pattern is less than the planar radius $\{(R+2P)/2\}$ of the lens pattern, as shown in FIG. 4b. The curvature is limited by the depth of the resulting lens pattern because the etching speed parallel to the roll surface and the etching speed perpendicular to the roll surface (in the direction of depth) are theoretically identical. In other words, the diameter R of the laser processing should be zero to form a hemisphere with a depth of one half that of the planar diameter of the lens pattern $(P/2P=\frac{1}{2})$. However, corrosion speed at the center of diameter R during exposure to etching solution is statistically faster than other parts of the pattern, and corrosion speed slows as etching proceeds, thereby causing the speed in every direction to be virtually identical. In addition, the lens pattern may be made deeper by physically accelerating the injection speed of the etching solution, thereby producing a higher corrosion speed in the direction of depth; however, the technique is limited to a depth of one hemisphere in curvature. In another method, if the depth is made deeper by reducing the diameter during laser processing, more etching is needed. Accordingly, the copper plating lacks uniformity, and corrosion speed is irregular and more easily disrupted by foreign objects and the like, thereby causing a crushed peanut shape, the shape of snowman, or other irregular shapes from the collapsed boundaries between lens patterns.

SUMMARY

The present disclosure is designed to provide a solution for the above-mentioned problems. In some embodiments of the present disclosure, a method is provided for producing lens patterns on a roll, wherein the roll is used to produce optical films, by which a variety of shapes in linear or non-linear lens patterns can be formed directly on the roll. In this disclosure, not only can the curvature of lens patterns be adjusted as desired, but also the depth of lens patterns can be made deeper than the hemisphere of the lens pattern, which has not been possible with conventional techniques when a linear or non-linear lens pattern is formed.

In other embodiments, a roll is provided for producing optical films, comprising a lens pattern formed thereon according to the above-described method. The roll may be various shapes, for example, a cylindrical roll.

These and other embodiments and advantages of the present disclosure will be further described in the following detailed description.

The above embodiment can be achieved by a method of producing a lens pattern on a roll, wherein the roll is used to produce optical films, comprising: forming a resin film on the roll comprising a plated layer which has been surface-plated with copper (Cu) or nickel (Ni); producing a preliminary lens pattern by striking the surface of the resin film on the roll with a chisel; etching with an etching solvent the roll having the preliminary lens pattern formed thereon; and removing the resin film.

In some embodiments, the preliminary lens pattern is produced on the resin film and is produced on the plated layer on the roll.

In a particular embodiment, the present disclosure further comprises performing electrolytic plating using chrome (Cr) or electroless plating using nickel (Ni). In a particular aspect of this embodiment, the electrolytic plating or the electroless plating occurs after etching the roll and before removing the resin film. In another aspect of this embodiment, the electrolytical plating or the electroless plating occurs after removing the resin film.

In another particular embodiment, when the surface of the resin film on the roll is struck with a chisel, the roll is rotating.

In some embodiments, the chisel has a blade angle of at least about 80°, such as about 100° or about 120°. In other embodiments, the chisel comprises diamond.

In yet other embodiments, the resin film is formed from any one of polyimide, acrylic resin, urethane resin, liquid photoresist or dry film photoresist.

In some embodiments, there is provided a roll for producing optical films, comprising a lens pattern formed thereon by a process comprising:

forming a resin film on the roll comprising a plated layer which has been surface-plated with copper (Cu) or nickel (Ni);
  producing a preliminary lens pattern by striking the surface of the resin film on the roll with a chisel;
  etching with an etching solution the roll having the preliminary lens pattern formed thereon; and
  removing the resin film.

In a particular embodiment, there is provided a roll wherein the preliminary lens pattern is produced on the resin film and is produced on the plated layer on the roll.

In another embodiment, there is provided a roll wherein the process further comprises performing electrolytic plating using chromium (Cr) or electroless plating using nickel (Ni) after etching the roll and before removing the resin film. In a particular aspect of this embodiment, the electrolytic plating or the electroless plating occurs after etching the roll and before removing the resin film. In another aspect of this embodiment, the electrolytical plating or the electroless plating occurs after removing the resin film.

In other embodiments, there is provided a roll, wherein when the surface of the resin film on the roll is struck with a chisel, the roll is rotating. In some embodiments, chisel has a blade angle of at least about 80°. In other embodiments, the chisel comprises diamond.

In yet other embodiments, the resin film is formed from any one of polyimide, acrylic resin, urethane resin, liquid photoresist or dry film photoresist.

According to the present disclosure, linear or non-linear lens patterns can be formed directly on a roll, which is used to produce optical films. The shapes of lens patterns can be diversified, the curvature of lens patterns can be adjusted as desired, and the curvature can be formed deeper than the hemisphere of the pattern, among others.

BRIEF DESCRIPTION OF THE DRAWINGS

These and other features, aspects, and advantages of the present disclosure will help for better understanding with regard to the following description, appended claims, and accompanying drawings, in which components are referred to by reference numerals.

FIG. 4b is a conceptual cross-sectional view of the lens pattern produced according to the process of FIG. 4a;

DETAILED DESCRIPTION

Hereinafter, embodiments of the present disclosure will be described in detail with reference to the accompanying drawings. It should be understood that the detailed description of the embodiments of the disclosure are given by way of illustration only, and accordingly various changes and modifications within the scope of the disclosure will become apparent to those skilled in the art from this detailed description.

Figure 5:
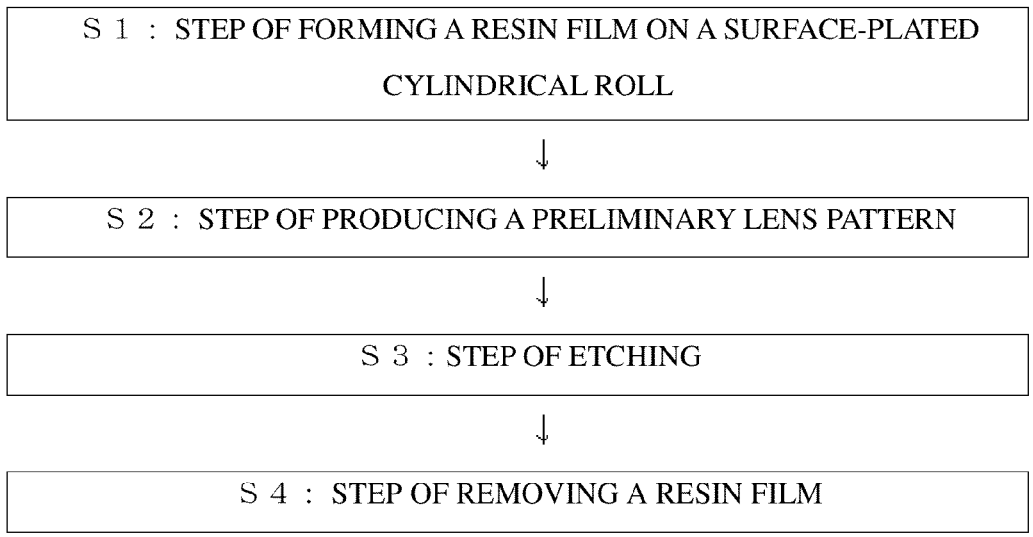
FIG. 5 is a process diagram for producing a lens pattern on a roll for producing optical films according to an embodiment of the present disclosure.
Figure 6:
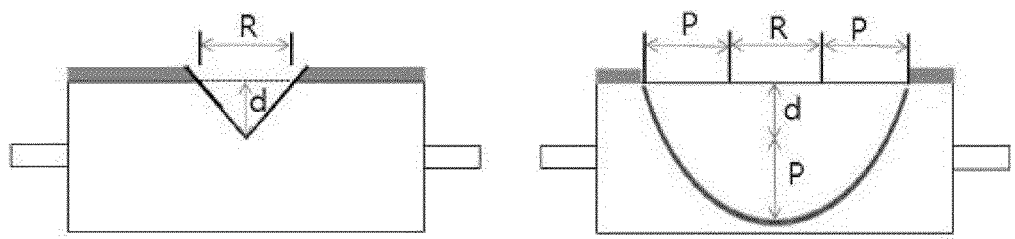
FIG. 6 is a diagram illustrating the principle of the method of producing a lens pattern on a roll for producing optical films according an embodiment of the present disclosure.

FIG. 5 shows a process diagram of a method of producing lens patterns on a roll for producing optical films according to an embodiment of the present disclosure, and FIG. 6 shows a diagram illustrating the manufacturing principle by a method of producing a lens pattern on a roll which is used to produce optical films according an embodiment of the present disclosure.

As shown in FIG. 5, a method of producing lens patterns on a roll which is used to produce optical films according to an embodiment of the present disclosure comprises: (S1) forming a resin film on a roll, such as a cylindrical roll, having a plated layer which has been surface-plated with copper (Cu) or nickel (Ni); (S2) producing a preliminary lens pattern by striking the surface of the resin film of the roll with a chisel; (S3) etching the cylindrical roll having the preliminary lens pattern formed thereon with an etching solution; and (S4) removing the resin film.

The preliminary lens pattern can be produced on both the resin film and the plated layer on the roll, and the preliminary lens pattern can be formed on the resin film and the plated layer on the roll by striking the surface of the resin film on the roll with a chisel while the roll is rotating. In this step, the chisel striking the resin film vibrates only in the perpendicular (vertical) direction of the roll, thereby forming grooves symmetrically on the roll by the rotation of the roll. In addition, by appropriately adjusting the timing of the strike and the rotation speed of the roll, a variety of shapes of lenses can be obtained. When striking a flat plate, the chisel can move in a vertical direction to the flat plate and in a direction parallel to the surface, thus forming a preliminary lens pattern, which can be difficult to implement mechanically.

Figure 1:
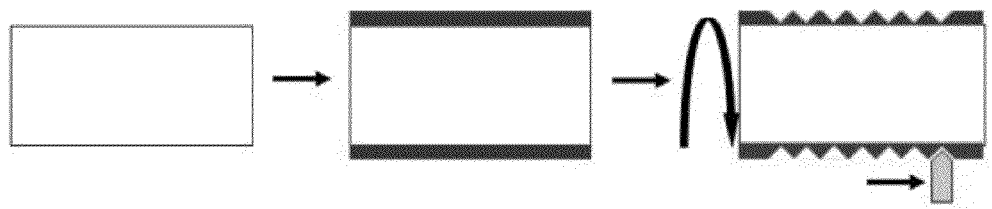
FIG. 1 is a process diagram for producing a linear lens pattern on a roll for producing optical films of prior art.
Figure 2:
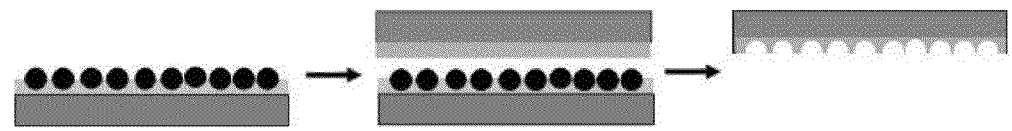
FIG. 2 is a process diagram for producing a non-linear lens pattern on a roll for producing optical films of prior art.
Figure 3:
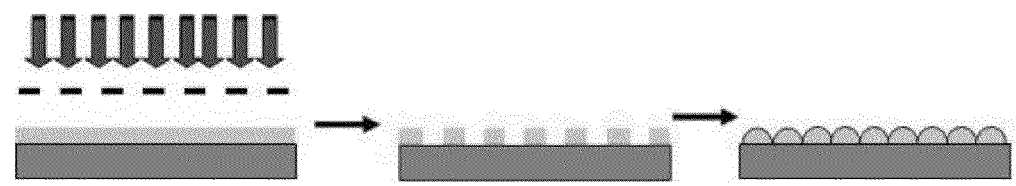
FIG. 3 is another process diagram for producing a non-linear lens pattern on a roll for producing optical films of prior art.
Figure 4A:
FIG. 4a is yet another process diagram for producing a non-linear lens pattern on a roll for producing optical films of prior art.
Figure 4B:
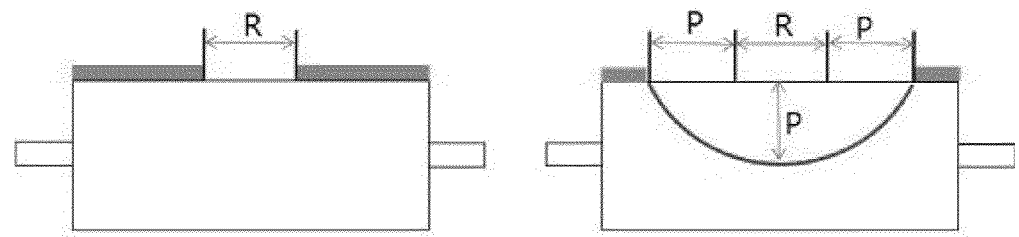

Compared to producing lens patterns through etching by removing only the film according to a conventional laser processing method (such as in FIG. 4a), the method of producing lens patterns on a roll according to the present disclosure has an advantage: the lens pattern can be formed deeper than by the conventional method, because etching adds depth to the cut from the chisel, resulting in a deeper lens pattern. Cutting away the surface of the plated layer (a copper or nickel layer) secures the depth of the lens pattern after the preliminary lens pattern is formed. The lens pattern is completed by etching. In other words, the width (R) and the depth (d) of the preliminary lens pattern as cut by a chisel are secured, and then the preliminary lens pattern is expanded by etching, thereby producing an new width (R+2P) and a new depth (d+P) in the resulting lens pattern (FIG. 6). The width and the depth of the resulting lens pattern can be varied by adjusting the shape, the length and the striking depth of the chisel. Various shapes of the lens pattern can be designed by first adjusting the width (R) and the depth (d) of the preliminary lens pattern and appropriately adjusting the etching width (2P) and the etching depth (p) during etching.

Though the chisel can be designed in various ways according to the desired depth, width and shape of the preliminary lens pattern produced, in a particular embodiment, the chisel is formed with a blade angle of at least about 80°, and in a particular aspect of this embodiment, diamond is used as the material for the chisel, in order to stably produce a significant number of preliminary lens patterns on the surface of the roll and to increase productivity. If the blade angle of the chisel is less than about 80°, the blade cannot endure and can break during a long striking process. Similarly, if the tip of the chisel blade is curved, not only may the chisel be damaged, but also the plated copper may be stripped from the roll.

The method for producing lens patterns on a roll which is used to produce optical films according to the present disclosure may further comprise performing electrolytic plating using chromium (Cr) or electroless plating using nickel (Ni). In some embodiments, the electrolytic plating or the electroless plating can occur after etching or after removing the resin film. In a particular aspect of this embodiment, the electrolytic plating or the electroless plating occurs after etching the roll and before removing the resin film. In the case of copper, the lens pattern formed after etching can rapidly oxide, thereby lowering the hardness of the roll and shortening the service life of the lens pattern roll for production of optical films. Accordingly, chromium or nickel is plated thereon to prevent such oxidation and subsequent softening of the roll. In the case of chrome plating, a typical electro-chemical plating is used and minute cracks may occur as the thickness of the film increases. Of greater concern is that thickness depends on which area of the lens pattern is plated, thereby causing deformation the shape thereof. Unlike chrome plating, electroless nickel plating by chemical reduction can prevent not only cracks but also deformation of the lens pattern, because nickel uniformly plates the same thickness of material over all areas of the lens pattern. Therefore, in a particular embodiment, electroless nickel plating is used instead of electrolytic chrome plating.

Moreover, in the method for producing lens patterns on a roll which is used to produce optical films according to the present disclosure, the resin film may be formed from any one of polyimide, acrylic resin, urethane resin, liquid photoresist or dry film photoresist. Though any kind of resins can be used as long as it can form a film, the resin must have excellent adhesiveness to the plated metal and not be etched by the etching solution in a subsequent step. Plated metals include, for example, copper, nickel, and chromium (chrome). Therefore, in a particular aspect of this embodiment, a polyimide film is made from liquid polyamic acid by coating the roll and curing the coating onto the roll to form a resin film on the roll.

Furthermore, a roll for producing optical films comprising lens patterns formed thereon according to the present disclosure is produced by any of the above-described methods for producing lens patterns on a roll, which is used to produce optical films.

EXAMPLES

Example 1

First, (S1) a resin film was formed using polyimide, which had been prepared by coating and curing liquid polyamic acid, on the surface of a cylindrical roll (made of iron; diameter of 200 cm and length of 50 cm), which had copper (Cu) surface-plated thereon at a thickness of about 100 μm.

Figure 7A:
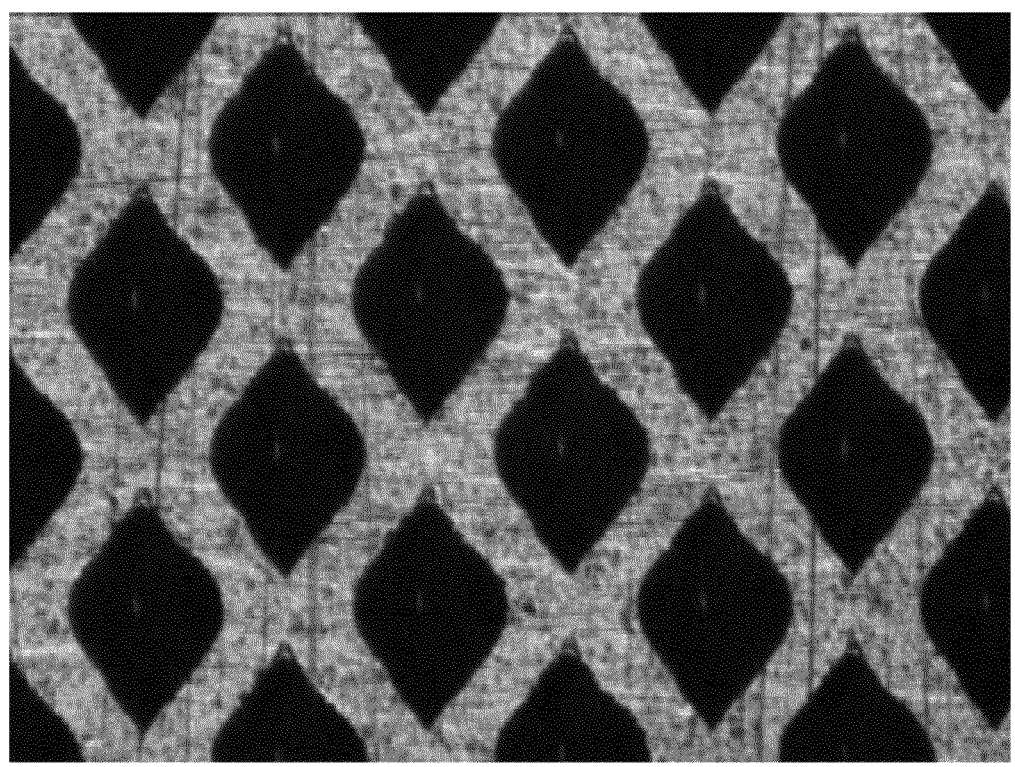
FIG. 7a is a photograph by an optical microscope of a surface of the roll having a preliminary lens pattern formed thereon according to an embodiment of the present disclosure.

Second, (S2) a preliminary lens pattern was produced on the resin film and on the plated layer on the cylindrical roll by striking with a chisel (made of diamond; the blade angle is 100°) the surface of the resin film on the cylindrical roll prepared by (S1). An optical photomicrograph of the surface of the resulting cylindrical roll was taken (FIG. 7a). When striking with a diamond chisel, the chisel was mounted onto a sonic vibrator comprised of a piezoelectric element. The chisel was forced to strike the surface of the resin film 8000 times per second to cut the surface of the roll.

Third, (S3) the cylindrical roll having a preliminary lens pattern formed thereon by the (S2) was etched using etching solution of iron chloride for 10 minutes.

Fourth, (S4) the resin film was removed using sodium hydroxide solution and was washed with water.

Figure 7B:
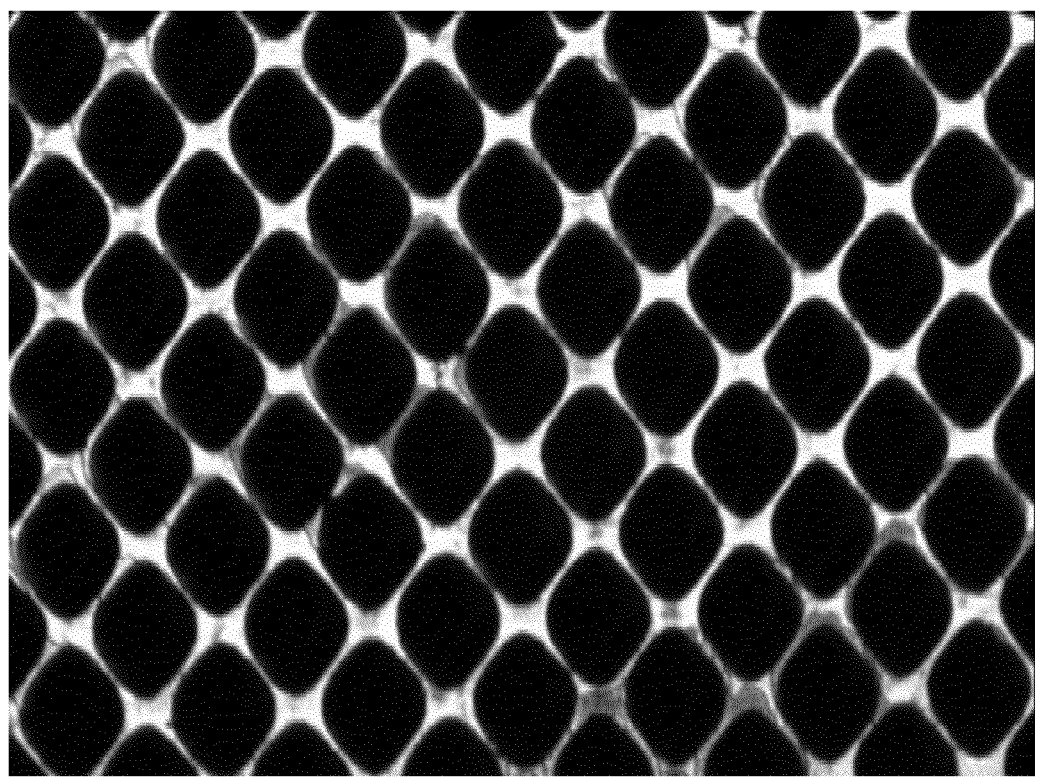
FIG. 7b is a photograph by an optical microscope of a surface of the roll having a final lens pattern formed thereon according to an embodiment of the present disclosure.

Thereafter, chromium (chrome) plating was applied in a manner typical to the art at a thickness of about 3 μm in order to protect the surface of the lens pattern and to improve surface hardness. The lens pattern of the resulting roll is shown in an optical photomicrograph of the surface on the cylindrical roll (FIG. 7b).

Figure 7C:
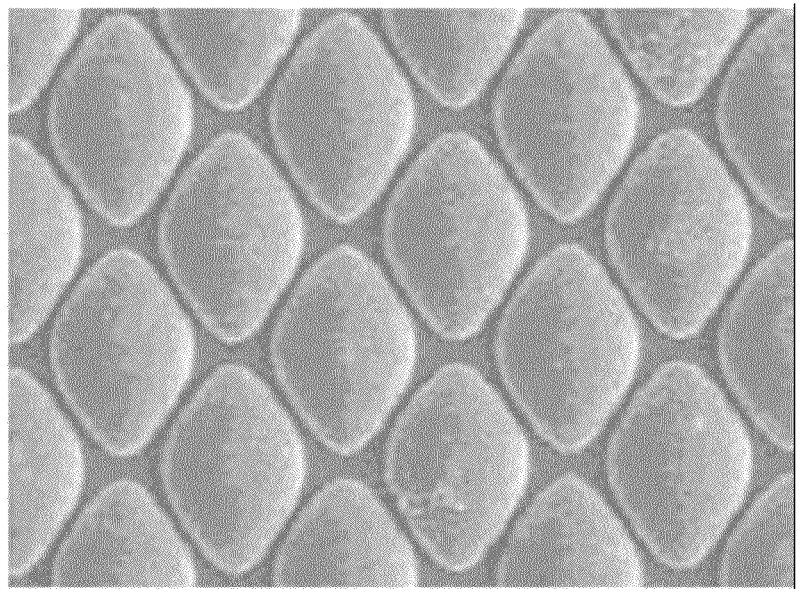
FIG. 7c is a photograph by an electron microscope of a surface taken after transferring a final lens pattern onto a film according to an embodiment of the present disclosure.
Figure 7D:
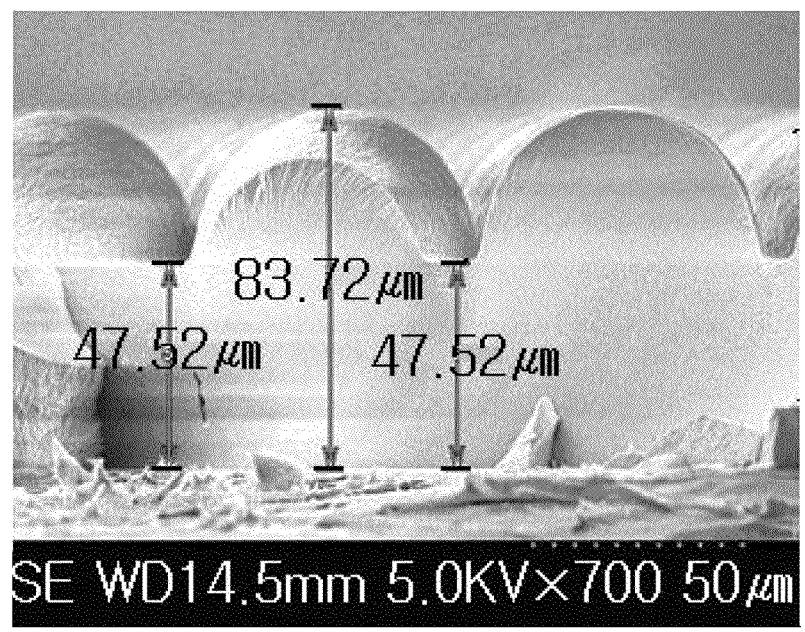
FIG. 7d is a photograph by an electron microscope of a cross-section taken after transferring a final lens pattern onto a film according to an embodiment of the present disclosure.

Then, the lens pattern was transferred onto and formed on an optical grade PET film by a method for producing optical films (such as prism films) in a manner typical to the art using the roll produced in Example 1. The result of the transfer and formation of a prism film is shown in a surface photograph taken by an electron microscope of FIG. 7c. A cross-sectional photograph of the lens pattern taken by the electron microscope is shown in FIG. 7d. As can be seen in the cross-sectional photograph of FIG. 7d, the depth of the lens pattern is larger than that of the hemisphere.

Example 2

Figure 8A:
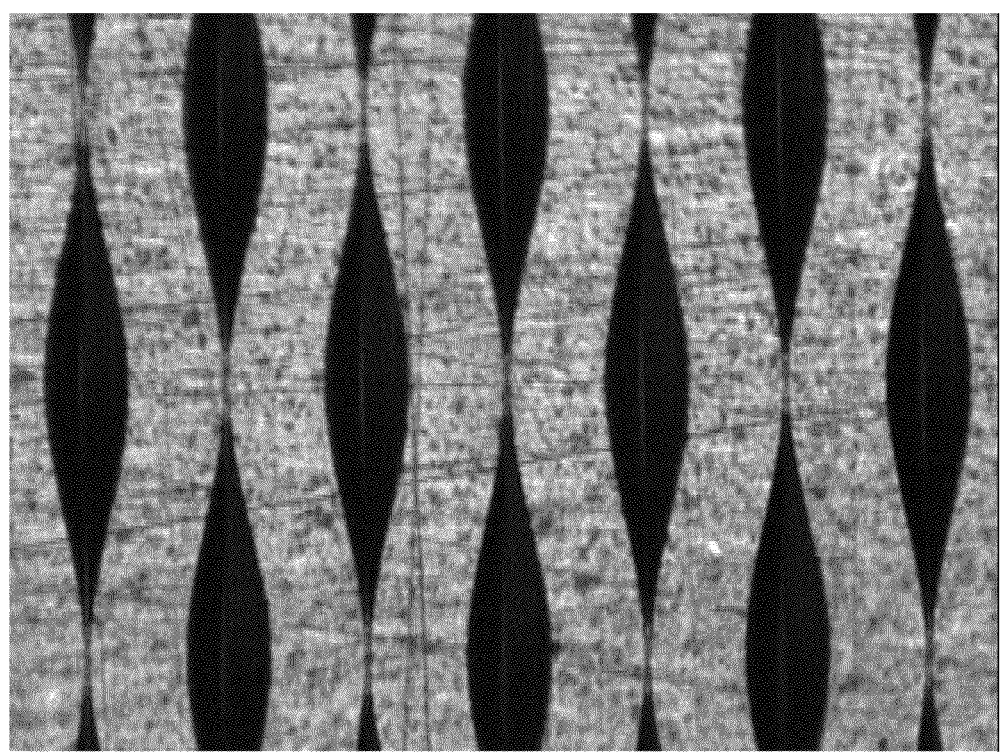
FIG. 8a is a photograph by an optical microscope of a surface of the roll having a preliminary lens pattern formed thereon according to another embodiment of the present disclosure.
Figure 8B:
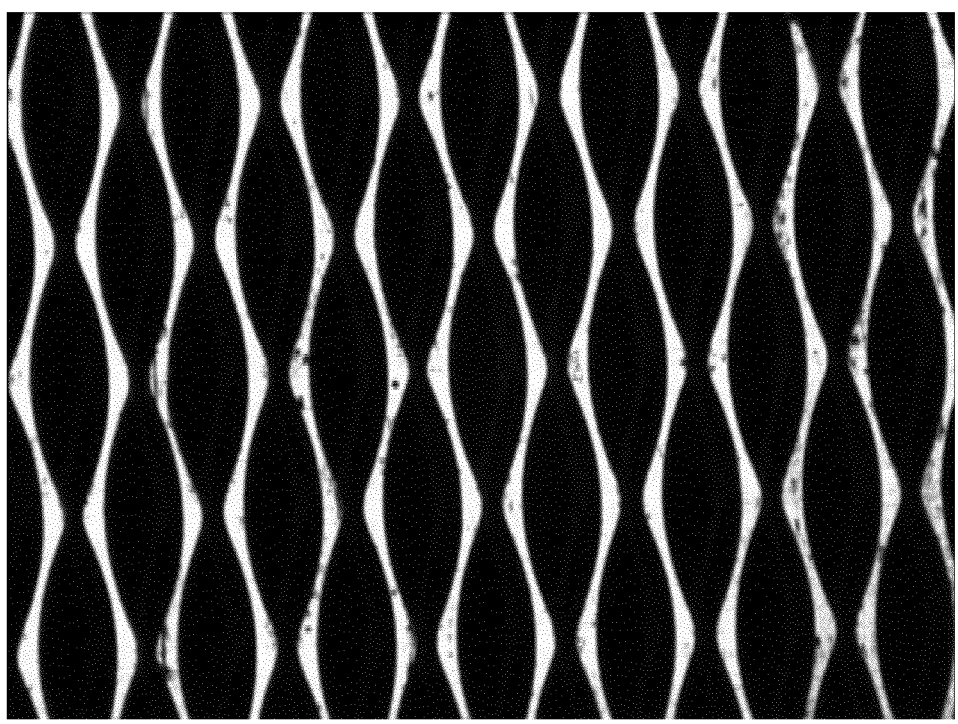
FIG. 8b is a photograph by an optical microscope of a surface of the roll having a final lens pattern formed thereon according to another embodiment of the present disclosure.

A lens pattern was formed on the roll in the same manner as the Example 1, except that the blade angle of the chisel was higher (120°) and the rotating speed of the roll in the Step 2 (S2) was different. The result of a preliminary lens pattern is shown in FIG. 8a, and the resulting lens pattern is shown in a surface photograph taken by an optical microscope of FIG. 8b.

Figure 8C:
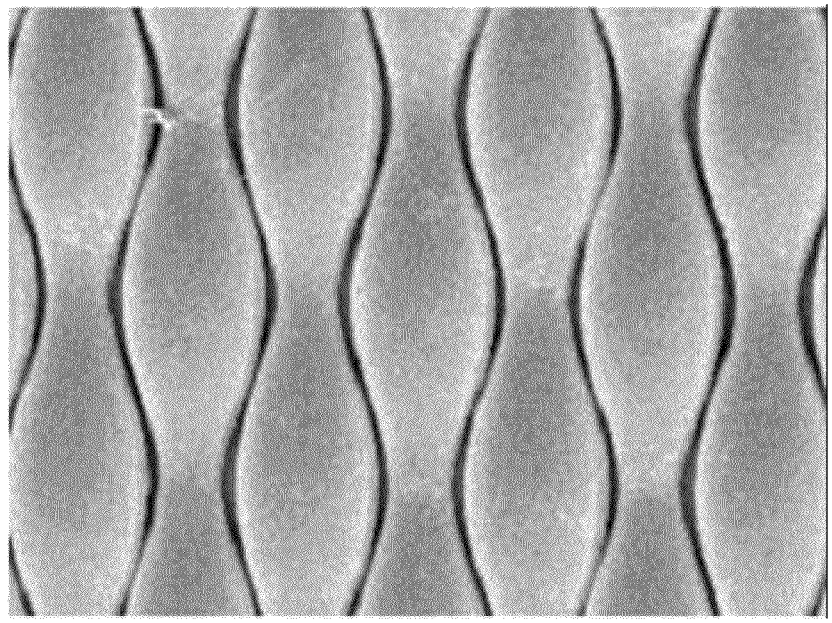
FIG. 8c is a photograph by an electron microscope of a surface taken after transferring a final lens pattern onto a film according to another embodiment of the present disclosure.
Figure 8D:
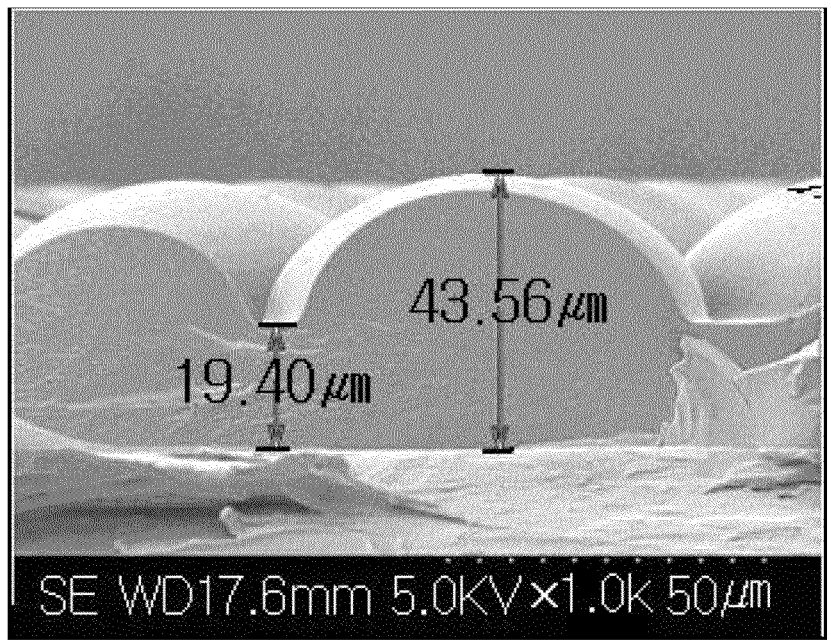
FIG. 8d is a photograph by an electron microscope of a cross-section taken after transferring a final lens pattern onto a film according to another embodiment of the present disclosure.

The lens pattern was transferred onto and formed on an optical grade PET film in the same manner as in Example 1, and the result is shown in a surface photograph of FIG. 8c and in a cross-sectional photograph of FIG. 8d taken by an electron microscope.

Therefore, according to the present disclosure, a linear or non-linear lens pattern can be formed directly on a roll for producing optical films, the shapes of lens patterns can be diversified, the curvature of lens patterns can be adjusted as desired, and the curvature can be formed deeper than the hemisphere of the lens pattern, among others.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

The terminology used herein is for the purpose of describing particular example embodiments only and is not intended to be limiting. As used herein, the singular forms "a", "an" and "the" may be intended to include the plural forms as well, unless the context clearly indicates otherwise. The terms "comprises", "comprising", "including", and "having", are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

What is claimed is:

1. A method for producing a lens pattern on a roll, comprising:
    forming a resin film on the roll, wherein the resin film is made from polyimide resin, acrylic resin or urethane resin, and wherein the roll comprises a layer plated with copper (Cu) or nickel (Ni);
    striking the resin film with a chisel mounted on a sonic vibrator to produce a preliminary lens pattern in the resin film and the roll;
    etching with an etching solution the resin film and the roll having the preliminary lens pattern; and
    removing the resin film,
        wherein the method further comprises performing electrolytic plating using chromium (Cr) or electroless plating using nickel (Ni) after the etching with the etching solution or the removing the resin film.

2. The method of claim 1, wherein the electrolytic plating or the electroless plating occurs after removing the resin film.

3. The method of claim 1, wherein when the surface of the resin film on the roll is struck with a chisel, while the roll is rotating.

4. The method of claim 1, wherein the chisel has a blade angle of at least about 80°.

5. The method of claim 4, wherein the chisel has a blade angle of at least about 100°.

6. The method of claim 4, wherein the chisel has a blade angle of at least about 120°.

7. The method of claim 1, wherein the chisel comprises diamond.

8. The method of claim 1, wherein the resin film is made from polyimide resin.

9. The method of claim 1, wherein the electrolytic plating is carried out with chromium (Cr).

10. The method of claim 1, wherein the resin film is made from polyimide resin and the electrolytic plating is carried out with chromium (Cr).

* * * * *